(12) United States Patent
Creeden et al.

(10) Patent No.: US 7,787,724 B2
(45) Date of Patent: Aug. 31, 2010

(54) NONLINEAR CRYSTAL AND WAVEGUIDE ARRAY FOR GENERATION OF TERAHERTZ RADIATION

(75) Inventors: Daniel Creeden, Nashua, NH (US);
Peter A. Ketteridge, Amherst, NH (US);
York E. Young, Amherst, NH (US);
Rick Thompson, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 62 days.

(21) Appl. No.: 12/075,767

(22) Filed: Mar. 13, 2008

(65) Prior Publication Data

US 2009/0232462 A1    Sep. 17, 2009

(51) Int. Cl.
*G02B 6/26* (2006.01)
*G02B 6/42* (2006.01)
*G02B 6/10* (2006.01)
*H01S 3/10* (2006.01)
*G02F 1/35* (2006.01)
*G02F 2/02* (2006.01)

(52) U.S. Cl. .................. 385/31; 385/39; 385/122; 372/21; 372/22; 372/23; 359/326

(58) Field of Classification Search .................. 385/31, 385/37, 39, 122; 372/21–23
See application file for complete search history.

(56) References Cited

U.S. PATENT DOCUMENTS

| 5,177,633 | A | 1/1993 | Wong |
| 5,321,718 | A | 6/1994 | Waarts et al. |
| RE35,215 | E | 4/1996 | Waarts et al. |
| 5,838,709 | A * | 11/1998 | Owa ........................ 372/68 |
| 5,912,910 | A | 6/1999 | Sanders et al. |
| 6,016,214 | A | 1/2000 | Meyer, Jr. et al. |
| 6,101,023 | A | 8/2000 | Meyer, Jr. et al. |
| 6,215,800 | B1 | 4/2001 | Komine |
| 6,711,203 | B1 | 3/2004 | Garnache et al. |
| 7,020,372 | B2 | 3/2006 | Lee et al. |
| 7,054,339 | B1 * | 5/2006 | Hu et al. ........................ 372/12 |

(Continued)

OTHER PUBLICATIONS

"High efficiency grating coupling of THz pulse radiation into dielectric waveguide," by Roux et al, Electronics letters, vol. 37, No. 23, Nov. 2001, pp. 1390-1392.*

(Continued)

*Primary Examiner*—Charlie Peng
*Assistant Examiner*—Robert Tavlykaev
(74) *Attorney, Agent, or Firm*—Finch & Maloney PLLC; Neil F. Maloney; Daniel J. Long

(57) ABSTRACT

Techniques for generating terahertz (THz) radiation are provided in which each nonlinear crystal in an array of such crystals is coupled to one or more corresponding waveguides such that any THz radiation generated in any single crystal is coupled into that crystal's THz waveguide structure. After the THz radiation is generated in the crystals and coupled into the waveguides, the individual THz signals may be coherently combined to form a single THz signal (non-coherent configurations are provided as well). Crystal-waveguide arrays embodying the techniques can be used to implement efficient, robust, and compact THz sources suitable for applications such as security screening, medical imaging, quality control and process monitoring in manufacturing operations, and package and container inspection.

20 Claims, 3 Drawing Sheets

U.S. PATENT DOCUMENTS

| | | |
|---|---|---|
| 7,078,697 B2 | 7/2006 | Barker et al. |
| 7,106,933 B2 | 9/2006 | Han |
| 7,239,777 B1 | 7/2007 | Christensen et al. |
| 7,272,158 B1 | 9/2007 | Hayes |
| 2005/0238070 A1 | 10/2005 | Imeshev et al. |
| 2006/0146893 A1 | 7/2006 | Belyanin |

OTHER PUBLICATIONS

"Nonlinear phase matching in THz semiconductor waveguides," by Berger et al, Semiconductor Science and Technology, vol. 19, 2004, pp. 964-970.*

"Hollow polycarbonate waveguides with inner Cu coatings for delivery of terahertz radiation," by Harrington et al, Optics Express, vol. 12, No. 21, Oct. 2004, pp. 5263-5268.*

"Designs of terahertz waveguides for efficient parametric terahertz generation," by Shi et al, Applied Physics Letters, vol. 82, No. 25, Jun. 2003, pp. 4435-4437.*

"Surface-emitted terahertz-wave from PPLN optical waveguide," by Sasaki et al, 29th Intl. Conference on Infrared and Millimeter Waves and 12th Intl. conference on Terahertz Electronics, 2004, pp. 335-356.*

"Surface-emitted terahertz-wave difference-frequency generation in periodically poled lithium niobate ridge-type waveguide," by Sasaki et al, Japanese journal of Applied Physics, vol. 45, No. 13, 2006, pp. L367-L369.*

"Photonic-crystal-fiber pigtail device integrated with lens-duct optics for terahertz radiation coupling" by Diwa et al, Applied Physics Letters, vol. 87, 2005, pp. 151114-1 through 151114-3.*

"Grating-assisted coupling of terahertz waves into a dielectric wavegduie studied by terahertz time-domain spectroscopy," by Roux et al, Applied optics, vol. 41, No. 30, Oct. 2002, pp. 6507-6513.*

Hu, et al; Terahertz Quantum Cascade Lasers, Electronics, and Real-Time Imaging; http://www.rle.mit.edu/media/pr148/27.pdf.

Coherent Light Sources & Spectrometers; http://www.coherent.com/Downloads/1106_PS%20Coherent%20Reprint.pdf.

Optical Parametric Oscillator http://en.wikipedia.org/wiki/Optical_parametric_oscillator.

Mueller; Terahertz Radiation Sources for Imaging and Sensing Applications http://www.gps.caltech.edu/~gab/spectrometers/spectrometers.html.

* cited by examiner

NONLINEAR CRYSTAL AND WAVEGUIDE ARRAY FOR GENERATION OF TERAHERTZ RADIATION

RELATED APPLICATIONS

This application is related to U.S. application Ser. No. 12/011,876 filed Jan. 30, 2008, and titled "Pump Recycling Scheme for Terahertz Generation" which is herein incorporated by reference in its entirety.

FIELD OF THE INVENTION

The invention relates to lasers, and more particularly, to terahertz radiation (THz) generation techniques.

BACKGROUND OF THE INVENTION

Radiation in the terahertz (THz) frequency range has certain properties that make it useful in applications such as spectroscopy, medical and security imaging, process monitoring and inspection in manufacturing, and remote sensing. This is because THz radiation can safely pass through living organisms and materials such as clothing fabrics, plastics, paper materials, masonry, and ceramics. In short, the THz radiation interacts with such materials causing certain information signals to be generated, which in turn can be used to form multi-dimensional images of the materials. In addition, measuring absorption of THz radiation as a function of wavelength allows for spectroscopic imaging and chemical composition detection.

However, there are problems associated with THz radiation generation. For instance, because of frequency conversion techniques, the Manley-Rowe conditions limit conversion efficiency. As a result, conventional THz generation techniques limit terahertz conversion efficiency and output power achievable.

What is needed, therefore, are techniques for efficient THz radiation generation.

SUMMARY OF THE INVENTION

One embodiment of the present invention provides a system for generating an output having one or more terahertz wavelengths. The system includes a plurality of nonlinear optical crystals, each for receiving a pump beam and generating a terahertz signal. The system further includes at least one waveguide coupled to each nonlinear optical crystal, for receiving and guiding the terahertz signal generated by that crystal. Each terahertz signal is included in the output of the system. The system may further include a pump source for providing a main pump beam that includes one or more wavelengths, and an N-way beam splitter for splitting the main pump beam into N individual pump beams. In one such case, the system includes N nonlinear optical crystals, and N or more waveguides. The pump source may be, for example, a single wavelength or dual wavelength pump beam (e.g., infrared range). The nonlinear optical crystals may, for example, implement at least one of difference frequency mixing (DFM) processes and optical parametric oscillation (OPO) processes. The nonlinear optical crystals can be implemented, for instance, with an orientation patterned gallium arsenide (OP—GaAs), periodically-poled lithium niobate (PPLN), zinc germanium phosphide (ZGP), gallium selenide (GaSe), or combinations thereof. The system may further include one or more metallic dielectric layers for controlling modal dispersion in the nonlinear optical crystals. The system may further include one or more insulating/heat-sink layers for at least one of removing heat from the structure, and preventing THz radiation from leaking from at least one of the nonlinear optical crystals into a non-corresponding one of the waveguides. A grating (or other suitable optical coupling mechanism) associated with each of the nonlinear optical crystals can be used to couple the terahertz signal from that crystal to a corresponding one of the waveguides. In one particular embodiment, the pump beam is provided by a common laser pump source, and each of the generated terahertz signals has the same wavelength and a definite phase relationship with the other generated terahertz signals. In another particular embodiment, at least one of the generated terahertz signals has a wavelength that is different from wavelengths of other generated terahertz signals. In another particular embodiment, each nonlinear optical crystal is coupled to a corresponding waveguide in an end-to-end configuration. In another particular embodiment, each nonlinear optical crystal is coupled to at least one corresponding waveguide in a side-to-side configuration. In one such case, each nonlinear optical crystal is coupled to multiple waveguides. In another particular embodiment, each nonlinear optical crystal and waveguides has an elongated shape that is about 200 to 400 micrometers thick and about 2 millimeter or more long.

Another embodiment of the present invention provides a system for generating an output having one or more terahertz wavelengths. The system includes a pump source for providing a main pump beam that includes one or more wavelengths, and an N-way beam splitter for splitting the main pump beam into N individual pump beams. The system further includes N nonlinear optical crystals, each for receiving one of the N individual pump beams and generating a terahertz signal. The system further includes at least one waveguide coupled to each nonlinear optical crystal, for receiving and guiding the terahertz signal generated by that crystal. Each terahertz signal is included in the output of the system, and has the same wavelength and a definite phase relationship with the other generated terahertz signals. Previously discussed features and details of the terahertz generation system may also be employed here.

Another embodiment of the present invention provides a system for generating an output having one or more terahertz wavelengths. The system includes a pump source for providing a main pump beam that includes one or more wavelengths, and an N-way beam splitter for splitting the main pump beam into N individual pump beams. The system further includes N nonlinear optical crystals, each for receiving one of the N individual pump beams and generating a terahertz signal. The system further includes at least one waveguide coupled to each nonlinear optical crystal, for receiving and guiding the terahertz signal generated by that crystal. In this particular case, each terahertz signal is included in the output of the system, and at least one of those terahertz signals has a wavelength that is different from wavelengths of other generated terahertz signals. Previously discussed features and details of the terahertz generation system may also be employed here.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
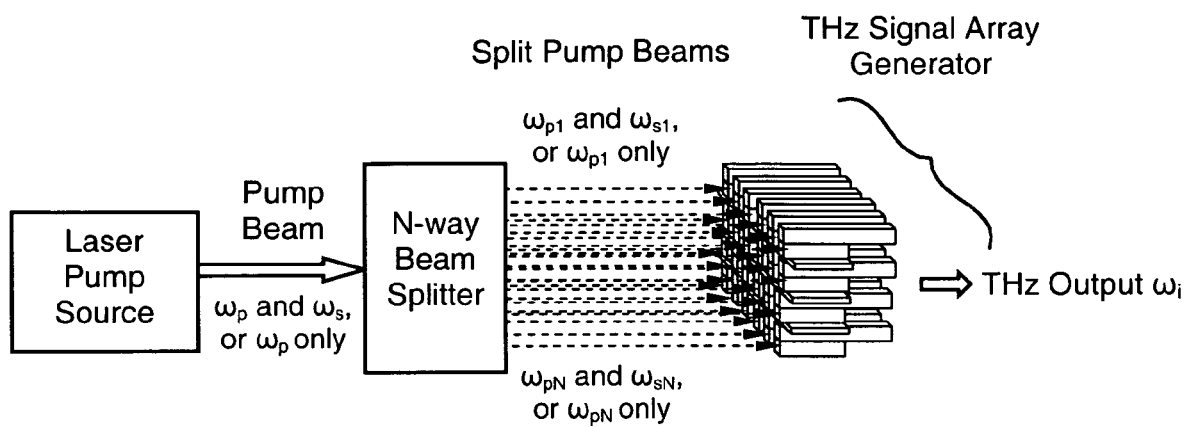
FIG. 1 illustrates a system for generating THz radiation, configured in accordance with one embodiment of the present invention.

Structures and techniques are disclosed that enable efficient generation of terahertz (THz) radiation. These structures and techniques can be employed, for example, to provide a highly efficient, high power, coherent terahertz radiation source, in applications such as security screening, airport imaging, and port security. Other applications, such as medical imaging, quality control and process monitoring in manufacturing operations, and package and container inspection will be apparent in light of this disclosure.

General Overview

Nonlinear optical crystals can be used to generate THz radiation by difference frequency mixing (DFM) or optical parametric oscillation (OPO) of two near-IR signals. These IR signals may be generated, for example, in a diode-pumped solid-state laser, gas laser, or a fiber laser, as previously discussed. By mixing these IR signals in a nonlinear crystal, a THz signal is generated, provided the difference frequency between the two mixing signals is in the THz region of the electromagnetic spectrum (0.1-10 THz). The nonlinear crystal can be, for example, zinc germanium phosphide (ZGP), gallium selenide (GaSe), or Gallium Arsenide (GaAs). However, such a bulk crystal approach for generating THz radiation is generally associated with low conversion efficiency due to crystal absorption.

Placing such a crystal in a waveguide, or coupling such a crystal to a waveguide, allows for more efficient generation and guiding of the THz radiation within that waveguide, as compared to pumping a single bulk crystal alone (which is associated with low conversion efficiency due to crystal absorption). One non-trivial issue associated with a waveguided crystal, is that the crystal cross-section must remain relatively small to efficiently couple the light into the waveguide without inducing excess losses at the THz wavelengths. Because of the small crystal size, the amount of pump energy used to generate the THz signal must be kept relatively low such that the crystal is not damaged. This low pump power leads to a low THz output power, albeit with a much higher conversion efficiency.

To further improve conversion efficiency and produce a high power THz signal, and in accordance with an embodiment of the present invention, an array of crystal-coupled waveguides may be used. By pumping several non-linear crystals (with each crystal coupled to an individual THz waveguide) with the same IR pump beams at the same time, several individual low-power THz beams can be generated simultaneously, and each will be guided by the waveguide to which it is coupled. These individual THz signals are coherently combined to produce a single, high power THz signal. Thus, a system is provided that enables efficient generation and coherent combination of an array of THz beams, thereby outputting high power THz radiation.

Although the system is discussed herein in the context of improving IR-to-THz conversion efficiency, other suitable pump sources can be used as well. Also, in some embodiments, where coherence is not required, and the THz signal array generator can be used to generate several different THz beams simultaneously. This can be done by pumping different types of crystals within the THz signal array generator with different pump beam wavelengths. Such a configuration has potential applications in spectroscopy and detection.

System Architecture

FIG. 1 illustrates a system for generating THz radiation, configured in accordance with one embodiment of the present invention. The system includes a laser pump source, an N-way beam splitter, and a THz signal array generator. In this example configuration, both the beam splitter and THz signal array generator are external to a laser pump source. In other embodiments, however, the beam splitter may be internal to the pump source (e.g., coupled directly to the output of laser resonator cavity), or alternatively, to the THz signal array generator. Likewise, the entire system may be potted or otherwise assembled into a single discrete unit.

The laser pump source outputs the desired wavelength (or wavelengths) of light to create phase-matching in nonlinear optical crystals of the THz signal array generator. In more detail, and as can be seen, the laser pump source can be configured to generate a dual wavelength pump beam (where the pump beam includes $\omega_p$ and $\omega_s$), or a single wavelength pump beam (where the pump beam includes $\omega_p$ only). In any such cases, the main pump beam is focused into the N-way beam splitter, which splits the main pump beam evenly into a plurality of N beams. Each of these N beams is then provided to a corresponding crystal of the THz signal array generator. The N-way beam splitter can be implemented with conventional technology suitable for splitting the frequency of the pump beam (e.g., infrared), and may further include optics for aligning or otherwise directing the output beams to their respective crystals. The beam splitter may be, for example, either free-space or fiber-coupled. In the case of fiber coupling, relay fibers may be used to couple the light into the crystal of the generator. In the example embodiment shown, N is equal to 24, such that the beam splitter divides the pump beam into 24 beams (e.g., $\omega_{p1}$ and $\omega_{s1}$ to $\omega_{p24}$ and $\omega_{s24}$ for dual-wavelength DFM processes, or $\omega_{p1}$ to $\omega_{p24}$ for single-wavelength OPO processes), and the THz signal array generator has 24 crystals operatively coupled to 24 or more waveguides.

Essentially any wavelength may be used for the pump beam, as long as it may phase-match in the nonlinear crystals of the THz signal array generator. For instance, in accordance with one embodiment and depending on the nonlinear optical crystals used in the THz signal array generator, the laser pump source may be a near-IR, mid-IR, or far-IR laser system. For example, the laser pump source may output 1-micron, 1.5-micron, 2-micron light, as they are easily generated. The laser pump source (which may include one or more laser sources) can be implemented, for instance, with a conventional laser source such as a diode-pumped solid-state laser, gas laser, or a fiber laser system. In one specific example embodiment, the laser pump source is implemented with an Ytterbium-doped fiber laser to generate a pump beam that includes 1.055 micron light and 1.064 micron light (the difference frequency of which is 122 microns).

The THz signal array generator, which will be discussed in more detail with reference to FIGS. 2a, 2b, and 3, generates high power coherent THz radiation (generally shown as $\omega_i$) from the light provided by the laser pump source and beam splitter. The generated THz radiation $\omega_i$ can be collected, for example, by a terahertz collection mirror or other suitable THz collection optic or optics assembly and/or otherwise provided to the target application. As previously explained, numerous applications can employ an embodiment of the present invention, including examples such as homeland security screening and airport imaging and port security (e.g., remote sensing/imaging of materials and explosives), as well as other applications including medical imaging, quality control and process monitoring in manufacturing operations, package and container inspection, and spectroscopy/detection.

THz Signal Array Generator

Figure 2A:
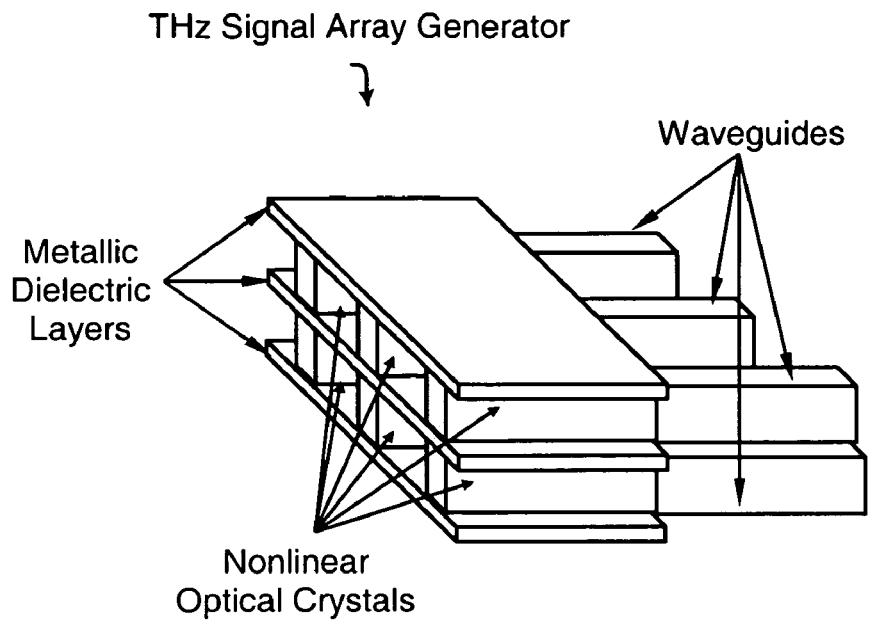
FIG. 2a illustrates a THz signal array generator that can be used in the system shown in FIG. 1, configured in accordance with one embodiment of the present invention.

FIG. 2a illustrates a THz signal array generator configured in accordance with one embodiment of the present invention. As discussed with reference to FIG. 1, this module can be configured for generating THz radiation with a single-wavelength or dual-wavelength pump source, depending on the configuration of the crystals used in THz signal array generator.

As can be seen, the example THz signal array generator includes a 3 by 2 array of nonlinear optical crystals, each of which is directly coupled to a waveguide. The optical crystals are used to generate THz signals, and the waveguides are used to guide the THz radiation and combine, direct, or otherwise manipulate the beam. The actual size and configuration of the array can vary from one embodiment to the next, depending on factors such as the desired THz output power, the amount of space available to deploy the generator as well as the shape of that space, and the present invention is not intended to be limited to any particular range of array sizes or configuration. In this sense, embodiments of the present invention can be used to efficiently scale the THz output power and to confine the THz output after it is generated.

The nonlinear optical crystals can be implemented in a number of ways, depending on the laser pump source capability. For instance, if the laser pump source is capable of producing dual-wavelength pump beam (i.e., $\omega_p$ and $\omega_s$), then the optical crystals can be used to implement a DFM process. Alternatively, if the laser pump source is only capable of producing single-wavelength pump beam (i.e., $\omega_p$ only), then the crystals can be used to implement an OPO process. In a DFM process, the two pump beam wavelengths $\omega_p$ and $\omega_s$ are mixed to generate THz photons. The $\omega_p$ signal is depleted and transfers energy to the $\omega_s$ signal, thereby amplifying $\omega_s$. Each time a pump photon with frequency $\omega_p$ is destroyed, a signal photon $\omega_s$ and an idler photon (with wavelength $\omega_i$, which is the THz radiation), are created to conserve energy. An OPO process, on the other hand, provides a nonlinear optical interaction that converts a single-wavelength pump beam $\omega_p$ into two output waves of lower frequency ($\omega_s$ and $\omega_i$, referred to as signal and idler, respectively). The sum of the output wave frequencies is equal to the input wave frequency (i.e., $\omega_s + \omega_i = \omega_p$). In such DFM and OPO applications, the idler frequency $\omega_i$ is the signal of interest, so after a single mixing stage, the amplified signal radiation $\omega_s$ can be discarded. Alternatively, the leftover signal $\omega_s$ can be recycled to drive additional nonlinear processes, if so desired, as described in the previously incorporated U.S. patent application Ser. No. 12/011,876. Such pump recycling enables further efficient generation of THz radiation capable of surpassing the fundamental quantum limit, as defined by the Manley-Rowe relations. In one example embodiment, the DFM and/or OPO crystals of the THz signal array generator can be implemented with orientation patterned gallium arsenide (OP-GaAs), periodically-poled lithium niobate (PPLN), zinc germanium phosphide (ZGP), gallium selenide (GaSe), or combinations thereof. The dimensions of the nonlinear optical crystals will depend on the THz wavelength of interest, and numerous dimensions can be used. In one example embodiment, each crystal is about 300 microns thick, +/−100 microns (e.g., having a square cross-section) and about 3 to 4 millimeters long.

Operatively coupling each crystal directly to a waveguide as shown in FIG. 2a allows for THz guiding in the waveguide. The individually generated THz beams can be coherently combined in the waveguide structure, thereby creating a single, high power THz signal (e.g., pulse having desired amplitude). The waveguides can be implemented with any material capable of guiding the THz radiation with no or otherwise acceptable losses. Example waveguide materials include Teflon, gold, copper, plastics, and other such suitable materials. Just as with the nonlinear optical crystals, the dimensions of the waveguides will depend on the wavelength of the THz radiation being generated. In the embodiment shown, the waveguides have dimensions comparable to the crystals to which they are coupled, although numerous other dimensional configurations will be apparent in light of this disclosure. In any case, the waveguides are able to effectively guide the THz signal generated by the crystals. The waveguides can be, for example, hollow waveguides, ribbon waveguides, wire waveguides, fibers, or any other suitable waveguide structures capable of guiding the THz radiation generated by the crystals to which they are coupled. Gratings written or etched into the nonlinear optical crystal material may be used to couple the THz from the crystal to the waveguide. THz transparent epoxy or other suitable bonding material can be used to secure the crystals to the waveguides as shown. Alternatively, once the crystals and waveguides are aligned, the THz signal array generator structure can be potted (e.g., epoxy resin or other suitable potting material), so as to secure the assembly.

As also shown in FIG. 2a, metallic dielectric layers are disposed between the crystals. In particular, there is a bottom metallic dielectric layer having three crystals disposed thereon in a spaced fashion. A middle metallic dielectric layer is disposed on top of those crystals, and further has three more crystals disposed thereon. Finally, a top metallic dielectric layer is disposed on those three crystals. The metallic dielectric layers of this embodiment are used to control or otherwise modify the dispersion in the nonlinear optical crystals, such that the phase-matching characteristics of the crystals can be varied. In this sense, each crystal is sitting inside its own waveguide (in addition to the waveguide to which it is coupled at its end). Such a configuration allows for propagation of THz radiation through the elongated direction of each crystal and multiple passes within the crystal. After several passes within crystal, the pump cop is depleted, and THz radiation $\omega_i$ is generated. The generated THz radiation $\omega_i$ is transferred into the external waveguide optically coupled to the end of the crystal, as previously discussed. The metallic dielectric layers may be fabricated, for example, from the same materials as the waveguide materials (e.g., Teflon, gold, copper, plastics, and other such suitable materials). Just as with the crystals and waveguides, the dimensions of the metallic dielectric layers would depend on the THz wavelength being generated. In the embodiment shown, the metallic dielectric layers are rectangular in shape having about a length of about 3 to 4 millimeter (to cover the length of each crystal) and a width of about 6 to 8 millimeter (e.g., to cover all three adjacent crystals in one layer of the structure), and about 50 to 150 microns thick. The metallic dielectric layers may also be used to provide a heat-sink function, and the materials and dimensions will vary accordingly.

Figure 2B:
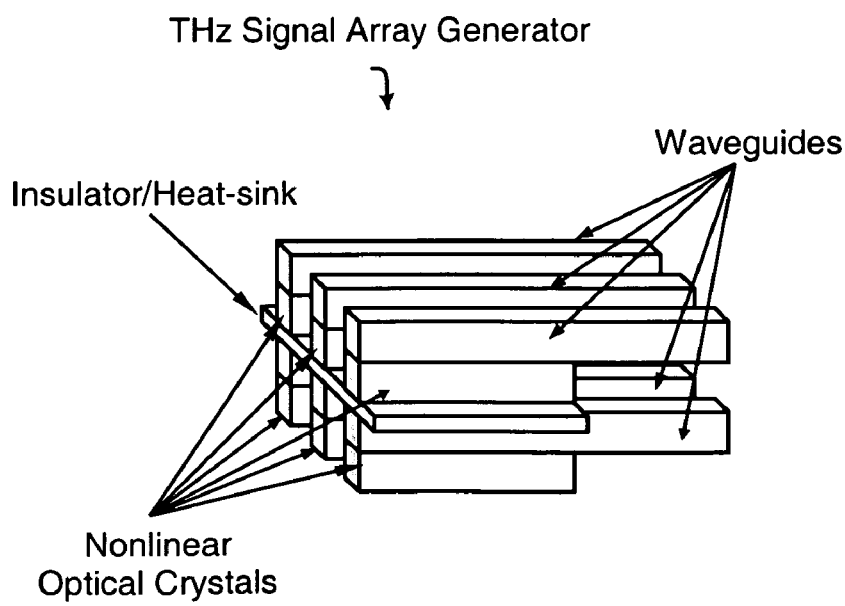
FIG. 2b illustrates a THz signal array generator that can be used in the system shown in FIG. 1, configured in accordance with another embodiment of the present invention.

FIG. 2b illustrates a THz signal array generator that can be used in the system shown in FIG. 1, configured in accordance with another embodiment of the present invention. Previous discussion with reference to FIG. 2a regarding crystal and waveguide materials, optical gratings and bonds, and other such THz signal array generator details, is equally applicable to this alternate embodiment, as will be apparent in light of this disclosure.

In this alternate configuration, the waveguides are placed on top of the nonlinear optical crystals. From a propagation perspective, the crystals are relatively thin (e.g., square or rectangular shape that is 300 microns thick, +/−100 microns, and about 3 to 4 millimeters long), so when the THz radiation is generated and begins to diffract in the crystals, it gets coupled immediately into the waveguide (as opposed to propagating the length of the crystal). In this sense, the THz radiation $\omega_i$ does not have to propagate far before it is optically coupled into the waveguide. Such a configuration is particularly suited when using nonlinear optical crystal materials that are lossy at THz wavelengths. The waveguides are also relatively thin and have a thickness and cross-section comparable to the crystals (e.g., square or rectangular shape that is 300 microns thick, +/−100 microns). In addition, the waveguides are about 5 to 8 millimeters long (about twice as long as the crystals, to allow for guiding of the generated THz signals to the output of the THz signal array generator.

Although each crystal in this embodiment is shown coupled to only one waveguide, alternative embodiments may have each crystal coupled to multiple waveguides (e.g., a waveguide on all available sides of each crystal) to maximize or otherwise increase coupling of the THz radiation. In the embodiment shown, for instance, each of the nonlinear optical crystals at the bottom half the structure (below the insulator heat-sink) could have up to four sides coupled to a waveguide, and the crystals at the top half of the structure (above the insulator heat-sink) could have up to three sides coupled to a waveguide. With respect to the fourth side of the nonlinear optical crystals at the top half of the structure, the insulator/heat-sink may further act as a waveguide, as will now be discussed.

As previously mentioned, the insulator/heat-sink is disposed between the top set of crystal-coupled waveguides and the bottom set of crystal-coupled waveguides. The insulator/heat-sink can be used to remove heat from the structure and to prevent THz radiation from leaking from the crystals in the top half of the structure into the waveguide below the crystal in the bottom half of the structure. Such a configuration can be used to ensure that THz radiation is only coupled into the waveguide for which it is designed (e.g., should the top crystals generate THz radiation that is different from the THz radiation generated by the bottom crystals). In this sense, the insulator/heat-sink optically separates each layer of the crystal-coupled waveguides. The insulator/heat-sink can also be used to provide a stable platform for the nonlinear optical crystals and gives the generator structure.

Thus, the example configurations of FIGS. 2a and 2b show that the nonlinear optical crystals and waveguides can be configured as relatively small, elongated shapes. These crystals and waveguide shapes can be optically coupled end-to-end (FIG. 2a) or side-to-side (FIG. 2b), depending on factors such as the desired propagation distance and how lossy the crystal material is at the target THz wavelengths. As will be appreciated in light of this disclosure, the length of the elongated shapes can range, for example from 1 to 10 millimeters, and the thickness can range, for example, from 100 to 1000 microns. The cross-section of the crystals and waveguides can have any number of suitable shapes, such as square, rectangular, or round.

Figure 3:
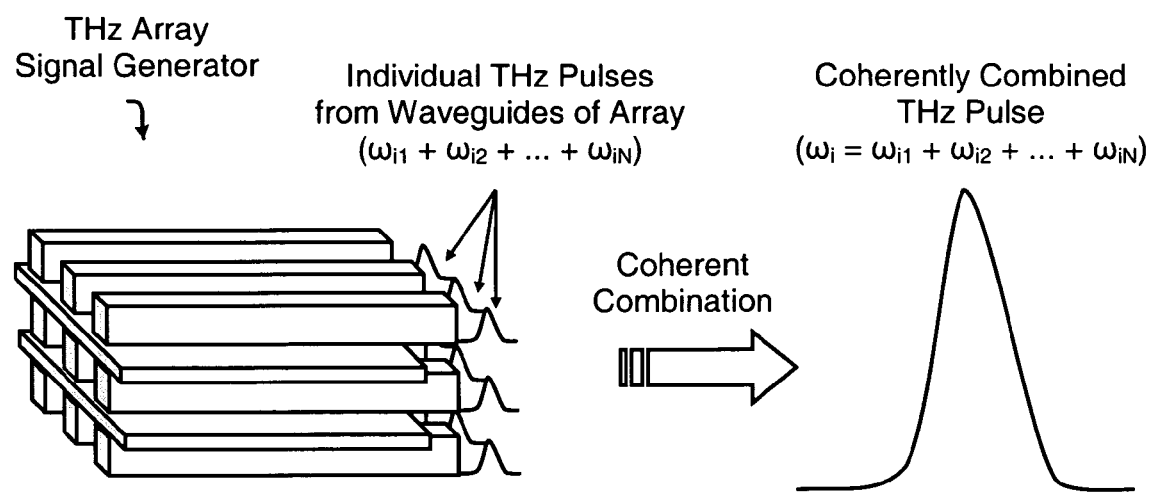
FIG. 3 illustrates THz pulses being coherently combined by a THz signal array generator configured in accordance with an embodiment of the present invention.

FIG. 3 illustrates THz pulses being coherently combined by a THz signal array generator configured in accordance with an embodiment of the present invention. In order for the THz signals ($\omega_{i1}+\omega_{i2}+\ldots+\omega_{iN}$) to have a phase relationship and so they have the same wavelength, a common laser pump source is used to pump the array (e.g., $t_0$ is the same for all wavelengths making up the pump beam). Thus, assume that the THz pulses are generated from the same IR pump signals (i.e., $\omega_p$ and $\omega_s$, or just $\omega_p$, are the same for all crystals). As such, the resulting individual THz signals will have the same wavelength and a definite phase relationship. This allows for the coherent combination of the THz signals ($\omega_{i1}+\omega_{i2}+\ldots+f_{iN}$) output by the THz signal array generator, where output $\omega_i=\omega_{i1}+\omega_{i2}+\ldots+\omega_{iN}$. The waveguides not only allow for coherent combination of THz beams, but also allow for modifying the phase-matching conditions in the nonlinear crystals by using modal dispersion properties of the waveguide at the THz wavelengths.

The THz signal array generator ultimately enables the generation of several THz signals which are spatially, temporally, and spectrally overlapped such that the multiple THz signals within the waveguides can by combined and emitted as a single THz pulse, thus improving the output power, efficiency, and pulse energy compared to a large-aperture, single-crystal THz generator. An optically-pumped THz signal array generator as described herein can be used, for example, to provide a higher-power local oscillator (LO) relative to traditional RF-based technologies (i.e., conventional techniques for LO production for coherent detection systems have suffered from low-power source availability).

If coherence is not required, and as previously explained, the THz signal array generator can be used to generate several THz beams simultaneously (the result being a high average power THz signal emitting from the generator), or even several different THz beams simultaneously. This latter non-coherent application can be done by pumping different crystals in the THz signal array generator with different IR wavelengths (or other pump beam having a suitable wavelength). The different pump beams will mix in the crystals to generate a different wavelength THz beam. Each mixing process can be implemented with a different crystal which would be dependent on the phase-matching criteria of the pump and THz beams. Such a configuration has potential applications in spectroscopy and detection.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for generating an output having one or more terahertz signals, comprising:
   a plurality of nonlinear optical crystals, each for receiving a pump beam and generating a terahertz signal, the pump beam having power kept at or below a threshold such that the crystal is not damaged; and
   at least one corresponding waveguide directly coupled to each nonlinear optical crystal, for receiving and guiding the terahertz signal generated by that crystal;

wherein at least some of the terahertz signals are coherently combined to produce a single THz pulse having power that exceeds the threshold and included in the output of the system.

2. The system of claim 1, further comprising:
a pump source for providing a main pump beam that includes one or more wavelengths; and
an N-way beam splitter for splitting the main pump beam into N individual pump beams.

3. The system of claim 2 wherein the pump source is one of a single wavelength or dual wavelength pump beam.

4. The system of claim 2 wherein the system includes N nonlinear optical crystals, and N or more waveguides.

5. The system of claim 1 wherein the nonlinear optical crystals implement at least one of difference frequency mixing (DFM) processes and optical parametric oscillation (OPO) processes.

6. The system of claim 5 wherein the nonlinear optical crystals are implemented with an orientation patterned gallium arsenide (OP-GaAs), periodically-poled lithium niobate (PPLN), zinc germanium phosphide (ZGP), gallium selenide (GaSe), or combinations thereof.

7. The system of claim 1 further comprising:
one or more metallic dielectric layers for controlling modal dispersion in the nonlinear optical crystals.

8. The system of claim 1 further comprising:
one or more insulating/heat-sink layers for at least one of removing heat from at least one of the nonlinear optical crystals and preventing THz radiation from leaking from at least one of the nonlinear optical crystals into a non-corresponding waveguide.

9. The system of claim 1 wherein a grating associated with each of the nonlinear optical crystals is used to couple the terahertz signal from that crystal to a corresponding waveguide.

10. The system of claim 1 wherein the pump beam is provided by a common laser pump source, and each of the generated terahertz signals has the same wavelength and a definite phase relationship with the other generated terahertz signals.

11. The system of claim 1 wherein at least one of the generated terahertz signals has a wavelength that is different from wavelengths of other generated terahertz signals.

12. The system of claim 1 wherein each nonlinear optical crystal is coupled to a corresponding waveguide in an end-to-end configuration.

13. The system of claim 1 wherein each nonlinear optical crystal is coupled to at least one corresponding waveguide in a side-to-side configuration.

14. The system of claim 13 wherein each nonlinear optical crystal is coupled to multiple waveguides.

15. The system of claim 1 wherein each nonlinear optical crystal and waveguide has an elongated shape that is about 100 to 400 micrometers thick and about 1 to 10 millimeters.

16. A system for generating an output having one or more terahertz signals, comprising:
a pump source for providing a main pump beam that includes one or more wavelengths;
an N-way beam splitter for splitting the main pump beam into N individual pump beams;
N nonlinear optical crystals, each for receiving one of the N individual pump beams and generating a terahertz signal, each pump beam having power kept at or below a threshold such that the crystal is not damaged; and
at least one corresponding waveguide directly coupled to each nonlinear optical crystal, for receiving and guiding the terahertz signal generated by that crystal;
wherein each terahertz signal is coherently combined to produce a single THz pulse having power that exceeds the threshold and included in the output of the system, and has the same wavelength and a definite phase relationship with the other generated terahertz signals.

17. The system of claim 16 wherein the pump source is one of a single wavelength or dual wavelength pump beam.

18. The system of claim 16 further comprising at least one of:
one or more metallic dielectric layers for controlling modal dispersion in the nonlinear optical crystals; and
one or more insulating/heat-sink layers for at least one of removing heat from at least one of the nonlinear optical crystals and preventing THz radiation from leaking from at least one of the nonlinear optical crystals into a non-corresponding waveguide.

19. A system for generating an output having one or more terahertz signals, comprising:
a pump source for providing a main pump beam that includes one or more wavelengths;
an N-way beam splitter for splitting the main pump beam into N individual pump beams;
N nonlinear optical crystals, each for receiving one of the N individual pump beams and generating a terahertz signal, each pump beam having power kept at or below a threshold such that the crystal is not damaged; and
at least one corresponding waveguide directly coupled to each nonlinear optical crystal, for receiving and guiding the terahertz signal generated by that crystal;
wherein at least some of the terahertz signals are coherently combined to produce a single THz pulse having power that exceeds the threshold and included in the output of the system, and at least some terahertz signals have a wavelength that is different from wavelengths of other generated terahertz signals.

20. The system of claim 19 further comprising at least one of:
one or more metallic dielectric layers for controlling modal dispersion in the nonlinear optical crystals; and
one or more insulating/heat-sink layers for at least one of removing heat from at least one of the nonlinear optical crystals and preventing THz radiation from leaking from at least one of the nonlinear optical crystals into a non-corresponding waveguide.

* * * * *